United States Patent [19]

Natori et al.

[11] Patent Number: 4,871,497
[45] Date of Patent: Oct. 3, 1989

[54] SLIP CASTING METHOD

[75] Inventors: Tatsuo Natori, Chiba; Takashi Shimaguchi, Ibaraki; Akihide Watanabe, Ibaraki; Toshihiro Yamada, Ibaraki, all of Japan

[73] Assignee: Hitachi, Ltd., Tokyo, Japan

[21] Appl. No.: 827,637

[22] Filed: Feb. 10, 1986

[30] Foreign Application Priority Data

Feb. 8, 1985 [JP] Japan .................................. 60-21696
Feb. 13, 1985 [JP] Japan .................................. 60-24323

[51] Int. Cl.⁴ ............................................... B28B 1/26
[52] U.S. Cl. ..................................... 264/86; 264/317; 419/40; 419/66
[58] Field of Search ................... 264/86, 317; 419/40, 419/66

[56] References Cited

U.S. PATENT DOCUMENTS

| | | |
|---|---|---|
| 1,846,279 | 2/1932 | Speirs . |
| 2,303,303 | 11/1942 | Schleicher .......................... 264/86 |
| 2,494,403 | 1/1950 | Nies et al. ........................... 264/86 |
| 3,848,040 | 1/1974 | Confer et al. ........................ 264/86 |
| 4,127,629 | 11/1978 | Weaver et al. ...................... 264/86 |

FOREIGN PATENT DOCUMENTS

| | | |
|---|---|---|
| 0135292 | 3/1985 | European Pat. Off. . |
| 415091 | 6/1925 | Fed. Rep. of Germany . |
| 3511694 | 3/1985 | Fed. Rep. of Germany . |
| 1597279 | 7/1970 | France . |
| 57-57727 | 4/1982 | Japan . |
| 1205952 | 9/1970 | United Kingdom . |
| 1390033 | 4/1975 | United Kingdom . |
| 1482436 | 8/1977 | United Kingdom . |
| 1594033 | 7/1981 | United Kingdom . |
| WO85/02578 | 8/1985 | World Int. Prop. O. . |

Primary Examiner—James Derrington
Attorney, Agent, or Firm—Antonelli, Terry & Wands

[57] ABSTRACT

In a casting method comprising casting a slip containing water or an organic solvent as the medium into a mold and removing the mold after solidification of the slip, use of a mold formed with an organic binder soluble in the medium of the slip allows the slip to quickly solidify and afford a green body due to absorption of the medium in the slip by the mold. In this case, the mold softens with loss of the binding power thereof simultaneously with the absorption of the medium. Therefore, no cracks appear at all in the green body, and removal of the mold is very easy.

16 Claims, 4 Drawing Sheets

FIG. 4
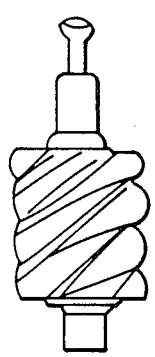
FIG. 5
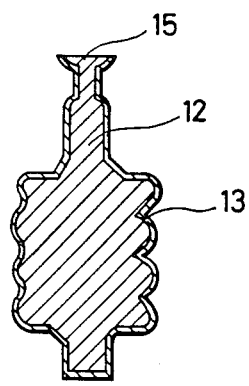
FIG. 6
FIG. 7
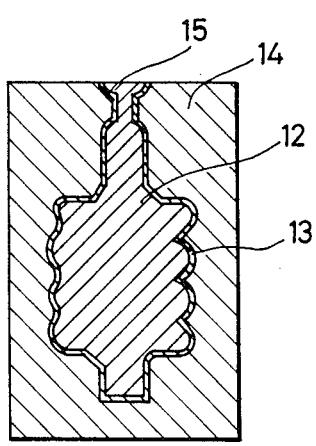
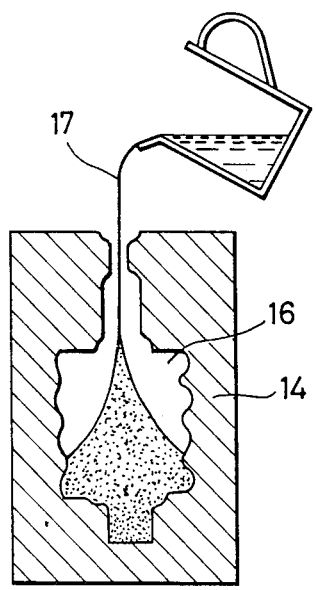

SLIP CASTING METHOD

BACKGROUND OF THE INVENTION

1. Field of the Invention

The present invention relates to a slip casting method in which a slip(slurry) of particles such as ceramic particles or metallic particles is cast to form a casting, and a casting mold therefor. Particularly, it relates to a casting method and a casting mold suitable for forming a casting having a complicated shape.

2. Description of the Prior Art

In slip casting of a hollow casting having a hollow portion of a complicated shape, specifically a casting requiring a core with a shape complicated enough to make it impossible to draw out the core by inversely inclining the casting, use of a gypsum mold makes the removal of the core difficult or impossible.

The prior art techniques related to the present invention include one disclosed in British Pat. No. 1,482,436. According to this technique, a desired mold is prepared by forming a partial mold with a complicated shape from a solvent-soluble organic material and another partial mold with a simple shape from gypsum, and assembling both of them. In this method, however, considerations are not given to the fact that a difference in the density of a green body may sometimes be produced between the organic portion and the gypsum portion depending on the shape and size of the casting to adversely affect the reliability on strength and dimensional accuracy of the casting, and workability.

OBJECT OF THE INVENTION

In view of the above, an object of the present invention is to provide a slip casting method and a casting mold, which make it possible to remove the mold immediately after solidification of a slip to prevent a casting from undergoing cracking, and which are suited to production of a casting having a complicated shape.

SUMMARY OF THE INVENTION

In accordance with the present invention, there is provided a casting method comprising casting a slip containing water or an organic solvent as the medium into a mold and removing the mold after solidification of the slip, wherein the above-mentioned mold is formed with an organic binder soluble in the medium of the above-mentioned slip.

Any fine particles may be used as the aggregate of the mold in so far as they are insoluble in the medium of the slip. Usable aggregates include alumina ($Al_2O_3$), magnesia (MgO), zircon sand, silica sand, and resin powders insoluble in the medium of the slip.

The first embodiment of the present invention is related to a casting method comprising casting a slip containing water as the medium into a mold and removing the mold after solidification of the slip, wherein the above-mentioned mold is formed with a water-soluble organic binder.

Water-soluble synthetic organic binders that can be used include polyvinyl alcohol (PVA), water-soluble isobutane-maleic anhydride copolymers, polyacrylamide (PAAm), polyethylene oxide (PEO), polyvinylpyrrolidone (PVP), water-soluble vinyl acetate copolymers, acrylic copolymers, polyethylene glycol (PEG), methylcellulose (MC), carboxymethylcellulose (CMC), hydroxypropylcellulose (HPC), and water-soluble waxes. One or more organic substances among them are used in the form of an aqueous solution thereof. Natural water-soluble binders such as starch, glue, and gum arabic may also be used.

The blending proportion of the aggregate, the binder, the aqueous saturated solution of the water-soluble resin, and diluting water is determined case by case with due consideration for workability in formation of the mold, dry strength of the mold, absorbability of a solvent (water) in the slip by the mold, collapsability of the mold after water absorption, etc. and, hence, cannot be uniformly determined.

To set up some definite criterion, however, 5 to 70 parts by weight of the binder and an adequate amount of water for improvement of formability of the mold may be added to 100 parts by weight of the aggregate particles.

When a slip containing water as the medium is cast into the above-mentioned mold, the mold can be collapsed only with the water contained in the slip when the mold has a comparatively thin wall. Where the mold has a thick wall, however, a sufficient amount of water enough to collapse the mold cannot be secured only from the slip. In this case, effective countermeasures include (i) making the wall of the mold as thin as possible, (ii) providing a hollow(s) inside thick-walled master mold and core, (iii) adding water into the mold from outside to improve the collapsability of the mold, and (iv) combining the measures (i), (ii), and (iii) properly.

Provision of one or a number of adequate hollows in the master mold and core (the above-mentioned measure (ii)) entails rendering the mold wall thin as well. Besides, it further provides an effect of facilitating addition of water from outside, which corresponds to the above-mentioned measure (iii). These act effectively on collapse and removal of the mold.

Also addition of water in the form of a spray is an effective method of water addition. Alternatively, according to another method of collapsing and removing the mold, the mold after slip casting i.e. mold and green body, is allowed to stand in a high-humidity chamber for a predetermined time to effect moisture absorption by the mold.

When a slip containing water as the medium is cast into a mold formed by solidifying aggregate particles with the aid of a water-soluble organic binder, the slip is solidified due to absorption of water in the slip by the mold while at the same time the mold becomes easily collapsable. This is illustrated with reference to FIGS. 1 (a), (b), and (c) as follows.

The aggregate particles 1 of the mold are covered with the water-soluble organic binder 2, when they are in a non-dried state (see FIG. 1 (a)). In contrast, in the dried and solidified mold, an innumerable number of micropores 3 are formed inside due to the evaporation of water. When the slip is cast into the mold as mentioned just above, water as the medium of the slip intrudes into the micropores 3 according to capillarity to dissolve the water-soluble binder 2. Thus the binding power of the binder 2 is drastically weakened to make the aggregate particles respectively independent (see FIG. 1 (c)).

When this phenomenon is viewed macroscopically, the mold undergoes transition to a collapsable state gradually from the interface thereof with the slip to the deep portion thereof, as it absorbs water. On the other hand, the slip increases its density to increasingly solidify, as it releases the water as the medium. Thus a green body is finally formed.

The green body shrinks little by little in the course of a subsequent dehydration step, whereas the mold is apt to swell due to absorption of water thereby, though the extent of swelling is slight. Since a common gypsum mold will not decrease its strength even when it absorbs water in the slip, cracks are liable to appear in a green body formed using the gypsum mold owing to a stress produced in the course of shrinkage of the green body and swelling of the mold.

By contrast, according to the present invention, since a mold is softened as it absorbs water, the mold never inhibits minute deformation such as shrinkage occurring in the course of formation of a green body. In other words, since the green body does not undergo any external force from (the mold, i.e. a master mold and a core), no stress is produced in the green body, leading to no appearance of cracks at all.

Therefore, even where the mold has a complicated shape because of a complicated shape of a casting (especially even where a core having a complicated shape is used), the mold becomes collapsable uniformly in all the portions since all the portions of the mold in contact with the slip absorb water necessary for collapse and removal thereof from the slip in such a way as to provide a uniform thickness of a layer into which water is absorbed.

Where the amount of water contained in the slip is insufficient for removal of the mold as in the case of a large thickness of the mold wall, addition of water from outside is effective as described above.

The mold is formed by tamping a kneaded mass of aggregate particles, a water-soluble binder, and water. The shaping time can be shortened if flowability is imparted to the mold material.

In imparting flowability to the molding material, an increase in the water content is, in principle, effective. However, a large amount of water is not easy to evaporate.

Accordingly, there is preferably adopted another flowability-imparting method comprising preparing an alcohol solution of a water-soluble binder which is stable in the form of a hydrate at ordinary temperatures, and adding thereto water in an amount necessary for being fixed as water of crystallization in binder molecules or in a slightly smaller amount than that.

As described above, since softening of the mold proceeds simultaneously with solidification of the slip, a ceramic casting having a complicated shape without any cracks can be very easily formed.

Immersion of the mold and the green body in warm water prior to sintering is not necessary unlike conventional methods. A sinter according to slip casting can be obtained without any limitation of the shape thereof.

The second embodiment of the present invention is related to a casting method comprising casting a slip containing an organic solvent as the medium into the mold and removing the mold after solidification of the slip, wherein the above-mentioned mold is formed from a mixture of an aggregate and a binder soluble in the solvent as the medium of the slip.

Just as in the above-mentioned first embodiment, any fine particles may be used as the medium of the slip in so far as they are insoluble in the medium of the slip.

A solvent-soluble binder is used in the form of an organic resin dissolved in an admixture solvent.

As the organic resin, one soluble in an organic solvent as the medium of the slip must be chosen.

More specifically, where the organic solvent as the medium of the slip is acetone, any acetone-soluble resins can be used as the organic resin, which include acrylonitrile-styrene copolymers, an ABS resin, methacrylic resins, polyvinyl acetate, vinyl acetate type resins, cellulose acetate type resins, cellulose nitrate type resins, cellulose acetate butyrate type resins, polyvinyl chloride resins, and polystyrene resins.

Where the organic solvent as the medium is ethyl alcohol, any ethyl alcohol-soluble resins can be used as the organic resin, which include acrylonitrile-styrene copolymers, methacrylic resins, polyvinyl acetate, cellulose acetate type resins, cellulose nitrate type resins, cellulose acetate butyrate type resins, and polystyrene resins.

Where the organic solvent as the medium is methyl alcohol, any methyl alcohol-soluble resins can be used as the organic resin, which include polyvinyl acetate, methacrylic resins, cellulose acetate type resins, cellulose nitrate type resins, cellulose acetate butyrate type resins, and ionomers.

Where the organic solvent as the medium is toluene, any toluene-soluble resins can be used as the organic resin, which include acrylonitrile-styrene copolymers, an ABS resin, methacrylic resins, polyvinyl acetate, polycarbonate, cellulose nitrate type resins, polyvinyl chloride resins, ethylene-vinyl acetate copolymers, ionomers, polypropylene, polybutylene, and polystyrene.

As the organic resin content of the binder vehicle (a mixture of an organic resin and an admixture solvent) is higher, the strength of the mold is higher, leading to improvements in the surface stability and surface smoothness of the mold and facilitation of handling of the mold. In this embodiment wherein the mold absorbs the solvent as the medium of the slip to lose the binding power thereof, however, excessive addition of the binder is not essentially preferred. The amount of the admixture solvent in the binder gives great influences on the workability of the mold formation. When the amount of the admixture solvent is too small for the aggregate, the mold material assumes a state close to that of grains. On the other hand, when the amount of the admixture solvent is too large, it assumes a state close to that of a slurry. Thus the amount of the admixture solvent should be adequately chosen though it depends on the method of preparing a mold, the filling method or the casting method.

As described above, the blending proportion of the components constituting the mold material, including the proportion of the binder relative to the mold aggregate and the proportion of the organic resin and the admixture solvent in the binder vehicle, varies depending on various conditions such as the properties and particle size distribution of the aggregate, the kinds of organic resin and admixture solvent, the shape and size of the mold to be formed, and the method of forming the mold. Thus the optimum values are experimentarily determined case by case. To show some definite criterion, however, 5 to 30 parts by weight of the organic resin contained in the binder vehicle, 5 to 30 parts by weight of the admixture solvent, and an adequate amount of a diluent may be added to 100 parts by weight of the aggregate. In this case, the diluent may be the same as the admixture solvent, but may be of a different kind in so far as it is uniformly miscible with the solvent and does not adversely affect the properties of the binder vehicle. For example, when methyl alcohol is used as the admixture solvent for a polyvinyl acetate resin, the diluent may be either methyl alcohol, or any one of ethyl alcohol, acetone, and ethyl acetate.

A thin-walled mold can be collapsed only with a solvent contained in a slip. However, a thick-walled mold can not secure a necessary amount of a solvent for effecting collapse thereof. In this case, the same countermeasures as in the above-mentioned first embodiment are effective. Specifically, (1) it is desirable to make the wall of the mold thin by providing a hollow(s) in the master mold and core.

In the case of a relatively thick-walled mold, (2) a predetermined amount of a solvent is added to the mold from outside by spraying or the like to effectively promote the collapse of the mold. More effective collapse of the mold can be achieved by combining the measures (1) and (2).

Also in this embodiment, the phenomenon that the mold is rendered easily collapsable can be illustrated in substantially the same manner as in the case of the aforementioned mold formed by binding the aggregate with the water-soluble binder.

An increase in the amount of the admixture solvent is, in principle, effective for imparting flowability to the mold material. Even when the admixture solvent is not ethyl alcohol but is, for example, acetone or toluene instead, addition of ethyl alcohol is still effective.

An increased amount of acetone or toluene may be satisfactory from the viewpoint of imparting flowability to the mold material. However, ethyl alcohol is rather desirable from the viewpoint of a working environment.

As described above, the mold undergoes transition to a collapsable state gradually from the interface thereof with the slip to the deep portion thereof, as it absorbs water. On the other hand, the slip increases its density and solidifies, as it releases the water as the medium. Thus a green body is finally formed.

The green body shrinks in the course of a subsequent solvent removal step, whereas the mold swells due to absorption of water thereby, though the extent of swelling is slight. Since a common gypsum mold will not decrease its strength even when it absorbs water in the slip, cracks are liable to appear in a green body formed using the gypsum mold owing to a stress produced in the course of shrinkage of the green body and swelling of the mold, namely the master mold and core.

By contrast, according to the present invention, a master mold and a core soften sequentially from the interface thereof with a slip toward the inner portion thereof without inhibiting shrinkage and deformation of a green body occurring in the course of formation of the green body. Thus no stress is produced in the green body. In other words, the green body does not undergo any external force from the mold (master mold and core). Therefore, no cracks appear at all.

Once it is softened and rendered easily collapsable, the mold does not harden again unless the solvent evaporates.

As described above, according to the present invention, since softening of the mold proceeds simultaneously with solidification of the slip, a casting with complicated shapes of an external appearance and a hollow(s) which has hitherto experienced a serious difficulty in formation thereof, in other words, a casting requiring a master mold and a core which have a large unevenness or a complicated shape, can be very easily formed without appearance of cracks.

BRIEF DESCRIPTION OF THE DRAWINGS

FIGS. 3 and 4 are views of external appearances of parts castable according to the present invention.

FIGS. 5 to 7 are illustrative views showing an example of the casting method according to the present invention, which concerns formation of the part shown in FIG. 4.

The following Examples will further illustrate the present invention.

EXAMPLE 1

100 parts (by weight; the same will apply hereinbelow) of $Al_2O_3$ (250- to 325-mesh) and 20 parts of a 5% aqueous solution of polyvinyl alcohol (PVA) were uniformly admixed to prepare a mold material.

Figure 1A:
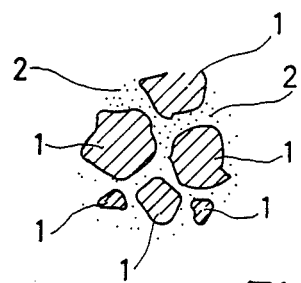
FIGS. 1 (a), (b), and illustrative views demonstrating that a mold absorbs water or an organic solvent to become easily removable.
Figure 1B:
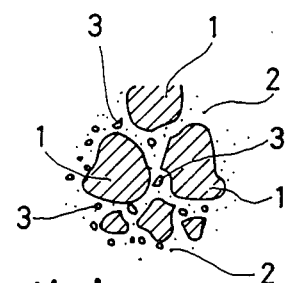
Figure 1C:
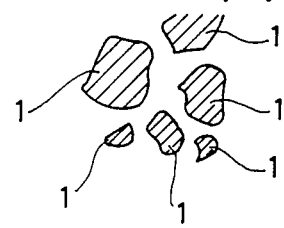
Figure 2:
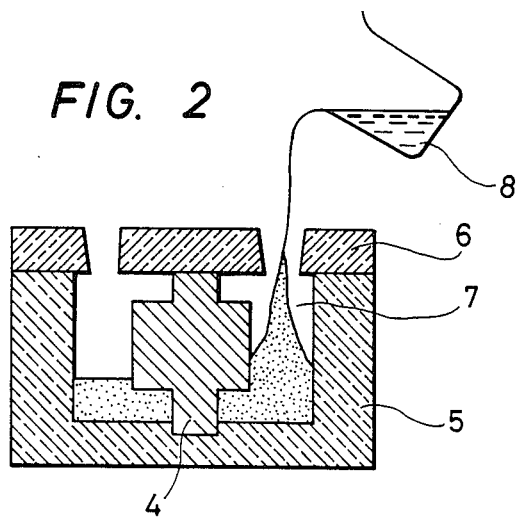
FIG. 2 is an illustrative view showing an example of the casting method according to the present invention.

Using wooden patterns separately prepared, a core 4 as shown in FIG. 2 was formed from the above-mentioned mold material, and gypsum master molds 5 and 6 were formed. The core 4 was sufficiently dried and hardened at 100° C. The gypsum master molds 5 and 6 were sufficiently dried at 60° C. Subsequently, these master molds and core were assembled to form a predetermined mold hollow.

Subsequently, an alumina slip 8 prepared by uniformly admixing 100 parts of $Al_2O_3$ having an average diameter of 2 $\mu$m, 16 parts of water, and minute amounts of a peptizer and a pH adjuster was cast into the above-mentioned hollow 7 of the mold, and allowed to stand for 1 hour.

After solidification of the slip, the gypsum master molds 5 and 6 were removed. Since the core 4 absorbed water in the slip and hence the binding power thereof was drastically reduced, it could be easily collapsed and removed. No appearance of cracks was recognized at all in a green body formed.

EXAMPLE 2

100 parts of $Al_2O_3$ (250- to 325-mesh) and 20 parts of a 5% aqueous solution of polyacrylamide (PAAm) were kneaded to prepare a mold material. A core was formed using a separately prepared wooden pattern in substantially the same manner as in Example 1, and then sufficiently dried and hardened at 100° C. It was assembled with separately formed gypsum master molds 5 and 6. A Sialon slip 8 prepared by uniformly admixing 100 parts of Sialon powders, 40 parts of water, a peptizer, and a sintering assistant was cast into the hollow 7 of the assembled mold, and allowed to stand for 1 hour. It was observed that the core 4 was easily removed as in Example 1, and that no appearance of cracks was recognized in a green body.

EXAMPLE 3

Figure 3:
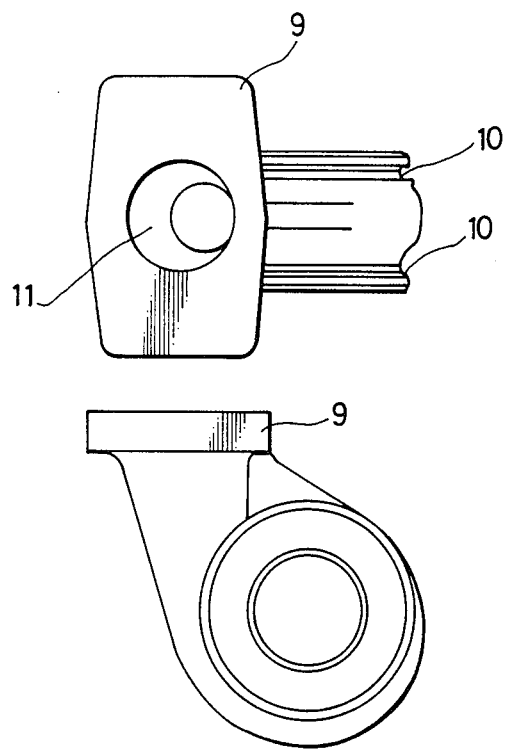

Utilizing the method and mold of the present invention, a casing as shown in FIG. 3 was prepared by slip casting. This casing has a very complicated shape including a flange 9, a groove 10 for fastening, and an inside spiral passage 11. Therefore, it could not be formed according to a slip casting method using a conventional mold.

100 parts of zircon sand (250- to 325-mesh) and 15 parts of a 5% aqueous solution of polyvinylpyrrolidone (PVP) were uniformly admixed to prepare a mold material. The mold material was then filled into a separately prepared rigid silicone rubber core box to form a spiral core, followed by sufficient drying at 100° C. The core was assembled with a separately prepared splittable gypsum master mold to form a mold. Subsequently, the same alumina slip as in Example 1 was cast into the mold, and allowed to stand for 2 hours.

Thereafter, the gypsum master mold was removed. The water-collapsable spiral core according to the present invention had already sufficiently absorbed water in the slip, resulting in drastic reduction of the binding power of the mold. Thus it was easily collapsed and removed.

The resulting alumina green body was air-dried and further dried at 100° C. to completely remove liberated water. It was then gradually heated from ordinary temperatures to 1,700° C. at which heating was continued for 2 hours. Thus an alumina sinter casing having good mechanical properties without any cracks was obtained.

EXAMPLE 4

A screw rotor as shown in FIG. 4 was formed according to the present invention.

Where such a shape is to be produced according to the conventional slip casting method using a gypsum mold, the mold must be split into a large number of pieces, resulting in reduction of dimensional accuracy, formation of a large number of burrs, breakage of a green body during the removal of the mold, etc. Thus great difficulty is encountered in practicing casting. Thus a pattern of the same screw rotor as shown in FIG. 4 (see FIG. 5) was separately foam-molded from foamable polystyrene by using a metallic mold. The whole surface, except for the top portion 15, of this pattern 12 was coated with a one-pack type RTV silicone rubber with a thickness of about 50 μm, followed by hardening of the rubber. Thus an insoluble coating film 13 was formed.

The top portion of the pattern was disposed on a pattern plate not shown in the figure, and a wooden flask was placed around the pattern. Subsequently, a mold material 14 prepared by uniformly admixing 100 parts of $Al_2O_3$ particles and 40 parts of a 5% aqueous emulsion of polyvinyl acetate was filled around the rotor pattern. Thereafter, acetone was sprayed from over the top portion 15 of the pattern 12 to shrink the foamed polystyrene pattern to about 1/30 of the original volume. As they remained as such, the resulting mold was dried and hardened at 100° C. Thereafter, acetone was sprayed over the polystyrene pattern again, and the pattern was picked out and removed together with the rubber film outside the mold. The mold was then dried and hardened at 100° C.

The same Sialon slip 17 as in Example 2 was cast into the hollow 16 of the formed mold. Water contained in the slip was absorbed by the casting mold to solidify the slip. The mold of this Example became very easily collapsable due to the drastically reduced binding power of the mold resulting from absorption of water thereby. Thus a green body was obtained without any damages to the screw portion of the rotor.

This Sialon green body was slowly dried in air and further dried in a furnace of 100° C. to completely remove liberated water. Thereafter, it was gradually heated from ordinary temperature up to 1,800° C. at which heating was continued for 2 hours to effect ordinary pressure sintering. Thus a homogenious Sialon rotor sinter was obtained.

EXAMPLE 5

100 parts of $Al_2O_3$ (250- to 325-mesh), 15 parts of a 30% solution of cellulose nitrate (solvent: acetone), and 15 parts of acetone were uniformly admixed to prepare a mold material. Using a wooden pattern separately prepared, a core 4 as shown in FIG. 2 was formed from the above-mentioned mold material, and sufficiently dried and hardened at 100° C. The core and gypsum master molds 5 and 6 separately prepared and dried at 60° C. were assembled to form a predetermined mold hollow.

Subsequently, a slip of a fine MgO powder in a medium of ethyl alcohol was cast into the hollow, and allowed to stand for 1 hour.

Since the cellulose nitrate resin as the binder of the core 4 was dissolved in ethyl alcohol as the medium to soften the mold, the core 4 could be easily removed, and no appearance of cracks was recognized at all in a green body.

EXAMPLE 6

100 parts of $Al_2O_3$ (250- to 325-mesh) and 50 parts of a 20% trichloroethane solution of polystyrene were uniformly admixed and kneaded to prepare a mold material. Using wooden patterns separately prepared, a core 4 and master molds 5 and 6 as shown in FIG. 2 were formed from the above-mentioned mold material, and then sufficiently dried and hardened with hot air of 70° C., followed by assembling in the same manner as in Example 5.

100 parts of a fine SiC powder, 3 parts of an inorganic carbon additive (gas black), and 1.5 parts of a densification assistant (boron-containing additive) were admixed.

Subsequently, the mixture was put into 50 parts of acetone as the dispersing medium, and 2 parts of a dispersant (monoethanolamine) was added to 100 parts of the resulting mixture.

The mixture thus obtained was homogeniously mixed by a vibration mill to prepare an SiC slip 8. The slip was cast into the hollow of the above-mentioned mold, and allowed to stand for 1 hour.

Since the polystyrene as the binder of the mold was dissolved in acetone as the medium to soften the mold with loss of the binding power thereof, the core 4 and the master molds 5 and 6 could be very easily removed, and a good crack-free green body was obtained.

EXAMPLE 7

100 parts of silica sand (250- to 325-mesh), 15 parts of a 48% solution of a polyvinyl acetate resin in a solvent of methyl alcohol, and 15 parts of ethyl alcohol were uniformly mixed. A core 4 and master molds 5 and 6 were formed in the same manner as in Example 5, followed by assembling. Thus a predetermined mold hollow was formed.

The same ceramic slip as in Example 5 was cast into the hollow, and allowed to stand for 1 hour. The core 4 lost the binding power thereof due to the ethyl alcohol, and could be very easily removed.

Thus a good green body was obtained.

EXAMPLE 8

The same slip as in Example 6 was cast into the same hollow of a mold as in Example 7, and allowed to stand for 1 hour. The core 4 lost the binding power thereof due to acetone contained in the slip, and could be very easily removed. Thus a good green body was obtained.

EXAMPLE 9

Figure 8A:
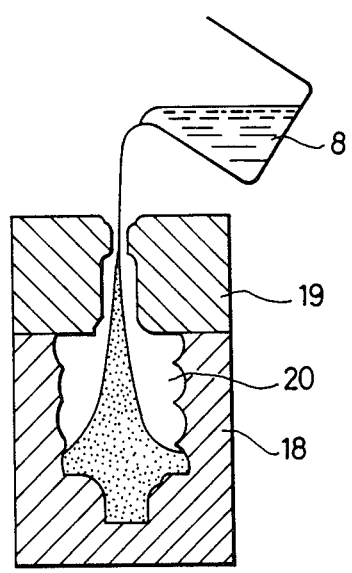
FIGS. 8 (a) and (b) are illustrative views showing another example of the casting method according to the present invention, which concerns formation of the part shown in FIG. 4.
Figure 8B:
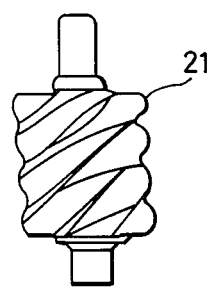

A resin pattern having the same shape as an SiC sinter as shown in FIG. 8 (a) was formed. Master molds 18 and 19 were formed using the pattern and a separately prepared flask, followed by assembling as shown in FIG. 8 (a). The master mold 18 was one formed by kneading 100 parts of $Al_2O_3$ (250- to 325-mesh), 60 parts of a 20% trichloroethane solution of polystyrene, and 30 parts of ethyl alcohol to prepare a slurry, casting the slurry into the flask, and drying the cast slurry.

The same SiC slip as in Example 6 was cast into the hollow 20, and allowed to stand for 1 hour.

Since the polystyrene as the binder of the mold was easily dissolved in acetone as the medium to soften the mold with loss of the binding power thereof, the master molds 18 and 19 having complicated shapes could be easily removed.

The resulting green body was sintered under predetermined conditions to obtain a complete, high-density SiC sinter 21.

EXAMPLE 10

100 parts of alumina (250- to 325-mesh), 20 parts of a 37% aqueous solution of polyacrylate, and 20 parts of water was uniformly mixed. Master molds 18 and 19 were formed from the resulting mold material and assembled in the same manner as in Example 9. The same SiC slip as in Example 6 was cast into the formed mold hollow, and allowed to stand for 0.5 hour. As a result, the binding power of the mold was drastically lost. When acetone was sprayed from the outside of the mold in order to further expedite the collapse of the mold, a good crack-free green body was obtained in a shorter time than that in Example 9.

What is claimed is:

1. A slip casting method, comprising casting a slip containing an organic solvent as a medium of said slip into a mold and removing said mold after solidification of said slip, wherein said mold is formed with an organic binder and an aggregate, said organic binder is soluble in said organic solvent, and said aggregate is particles insoluble in said organic solvent.

2. A slip casting method as claimed in claim 1, wherein said organic solvent as the medium of said slip is at least one material selected from the group consisting of alcohols, esters, and aromatic solvents.

3. A slip casting method as claimed in claim 1, wherein said organic solvent as the medium of said slip is acetone.

4. A slip casting method as claimed in claim 3, wherein said binder is a resin soluble in acetone.

5. A slip casting method as claimed in claim 4, wherein said binder is at least one material selected from the group consisting of acrylonitrile-styrene copolymers, an ABS resin, methacrylic resins, polyvinyl acetate, cellulose acetate resins, cellulose nitrate resins, cellulose acetate butyrate resins, polyvinyl chloride resins, and polystyrene resins.

6. A slip casting method as claimed in claim 1, wherein said organic solvent as the medium of said slip is ethyl alcohol.

7. A slip casting method as claimed in claim 6, wherein said binder is a resin soluble in ethyl alcohol.

8. A slip casting method as claimed in claim 7, wherein said binder is at least one material selected from the group consisting of acrylonitrile-styrene copolymers, methacrylic resins, polyvinyl acetate, cellulose acetate, cellulose acetate resins, cellulose nitrate resins, cellulose acetate butyrate resins, and polystyrene resins.

9. A slip casting method as claimed in claim 1, wherein said organic solvent as the medium of said slip is methyl alcohol.

10. A slip casting method as claimed in claim 9, wherein said binder is a resin soluble in methyl alcohol.

11. A slip casting method as claimed in claim 10, wherein said binder is at least one material selected from the group consisting of polyvinyl acetate, methacrylic resins, cellulose acetate resins, cellulose nitrate resins, cellulose acetate butyrate resins, and ionomers.

12. A slip casting method as claimed in claim 1, wherein said organic solvent as the medium of said slip is toluene.

13. A slip casting method as claimed in claim 12, wherein said binder is a resin soluble in toluene.

14. A slip casting method as claimed in claim 13, wherein said binder is at least one material selected from the group consisting of acrylonitrile-styrene copolymers, an ABS resin, methacrylic resins, polyvinyl acetate, polycarbonate, cellulose nitrate resins, polyvinyl chloride resins, ethylene-vinyl acetate copolymers, ionomers, polypropylene, polybutylene, and polystyrene.

15. A slip casting method comprising casting a slip containing an organic solvent as a medium of said slip into a mold and removing said mold after solidification of said slip, wherein said mold is formed with an organic binder and an aggregate, said organic binder is soluble in said organic solvent, and said aggregate is particles insoluble in said organic solvent, and wherein an admixture solvent for said binder is an alcohol, ester, or aromatic solvent, or a mixture thereof.

16. A slip casting method, comprising casting a slip containing an organic solvent as a medium of said slip into a mold and removing said mold after solidification of said slip, wherein said mold is formed with an organic binder and an aggregate, said organic binder is soluble in said organic.solvent, and said aggregate is particles insoluble in said organic solvent, and wherein an admixture solvent for said binder is at least one material selected from the group consisting of trichloroethane, trichloroethylene, methyl alcohol, ethyl aocohol, ethyl acetate, acetone, methyl ethyl ketone, diethyl ether, tetrahydrofuran, hexane, heptane, benzene, toluene, xylene, chloroform, and carbon tetrachloride.

* * * * *